(12) United States Patent
Bashtanov et al.

(10) Patent No.: US 11,998,913 B2
(45) Date of Patent: Jun. 4, 2024

(54) APPARATUS AND METHOD FOR SORTING MICROFLUIDIC PARTICLES

(71) Applicant: Cellular Highways Ltd., Royston (GB)

(72) Inventors: Mikhail Bashtanov, Royston (GB); Richard Gold, Royston (GB); Calum Hayes, Royston (GB); Fred Hussain, Royston (GB); Robyn Pritchard, Royston (GB); Salman Samson Rogers, Royston (GB); Nuno Varelas, Royston (GB); Alexander Zhukov, Royston (GB)

(73) Assignee: Cellular Highways Ltd., Royston (GB)

( * ) Notice: Subject to any disclaimer, the term of this patent is extended or adjusted under 35 U.S.C. 154(b) by 0 days.

(21) Appl. No.: 18/120,537

(22) Filed: Mar. 13, 2023

(65) Prior Publication Data

US 2023/0211343 A1 Jul. 6, 2023

Related U.S. Application Data

(63) Continuation of application No. 17/832,095, filed on Jun. 3, 2022, now Pat. No. 11,607,688, which is a
(Continued)

(30) Foreign Application Priority Data

Apr. 19, 2017 (GB) .................................... 1706205

(51) Int. Cl.
*B01L 3/00* (2006.01)
*G01N 15/14* (2006.01)
(Continued)

(52) U.S. Cl.
CPC ... *B01L 3/502753* (2013.01); *B01L 3/502715* (2013.01); *B01L 3/50273* (2013.01);
(Continued)

(58) Field of Classification Search
None
See application file for complete search history.

(56) References Cited

U.S. PATENT DOCUMENTS

2008/0196778 A1 8/2008 Baroud
2014/0315287 A1 10/2014 DiCarlo
(Continued)

FOREIGN PATENT DOCUMENTS

CN 106457239 A 2/2017
EP 2 482 055 A2 8/2012

OTHER PUBLICATIONS

International Search Report dated Aug. 14, 2018, in International Application No. PCT/GB2018/051027; Filed: Apr. 19, 2018; Applicant: TTP PLC.
(Continued)

*Primary Examiner* — Jennifer Wecker
*Assistant Examiner* — Oyeleye Alexander Alabi
(74) *Attorney, Agent, or Firm* — Erise IP, P.A.

(57) ABSTRACT

A single junction sorter for a microfluidic particle sorter, the single-junction sorter comprising: an input channel, configured to receive a fluid containing particles; an output sort channel and an output waste channel, each connected to the input channel for receiving the fluid therefrom; a bubble generator, operable to selectively displace the fluid around a particle to be sorted and thereby to create a transient flow of the fluid in the input channel; and a vortex element, configured to cause a vortex in the transient flow in order to direct the particle to be sorted into the output sort channel.

8 Claims, 16 Drawing Sheets

Related U.S. Application Data continuation of application No. 16/603,106, filed as application No. PCT/GB2018/051027 on Apr. 19, 2018, now Pat. No. 11,376,592.

(51) Int. Cl.
  *G01N 15/1404* (2024.01)
  *G01N 15/1434* (2024.01)
  *G01N 15/149* (2024.01)

(52) U.S. Cl.
  CPC ... *B01L 3/502738* (2013.01); *B01L 3/502776* (2013.01); *G01N 15/1434* (2013.01); *B01L 2200/0626* (2013.01); *B01L 2200/0631* (2013.01); *B01L 2200/0636* (2013.01); *B01L 2200/0652* (2013.01); *B01L 2200/0673* (2013.01); *B01L 2300/06* (2013.01); *B01L 2300/0654* (2013.01); *B01L 2300/0816* (2013.01); *B01L 2300/0864* (2013.01); *B01L 2300/0883* (2013.01); *B01L 2300/1805* (2013.01); *B01L 2400/0442* (2013.01); *B01L 2400/0487* (2013.01); *B01L 2400/06* (2013.01); *G01N 2015/1413* (2013.01); *G01N 15/149* (2024.01)

(56) References Cited

U.S. PATENT DOCUMENTS

| | | | |
|---|---|---|---|
| 2015/0328637 A1* | 11/2015 | Perrault, Jr. | G01N 35/00 435/287.1 |
| 2016/0059234 A1 | 3/2016 | Chang et al. | |
| 2016/0231223 A1 | 8/2016 | Wang et al. | |
| 2016/0296933 A1 | 10/2016 | Chiou et al. | |

OTHER PUBLICATIONS

Written Opinion of the International Searching Authority dated Aug. 14, 2018, in International Application No. PCT/GB2018/051027; Filed: Apr. 19, 2018; Applicant: TTP PLC.

Howell, Peter B. et al., "Design and evaluation of a Dean vortex-based micromixer," Lab on a Chip, vol. 4, No. 6, Date: Nov. 11, 2004.

European Patent Application 18721111.5 Supplemental Search Report dated Nov. 18, 2020.

Office Action issued in related Chinese Patent Application 201880039079.5 dated Mar. 10, 2021.

Second Office Action issued in related Chinese Patent Application 201880039079.5 dated Sep. 15, 2021.

* cited by examiner

5a.

5b.

5c.

7a.

7b.

(a)

(b)

APPARATUS AND METHOD FOR SORTING MICROFLUIDIC PARTICLES

RELATED APPLICATIONS

This application is a continuation of U.S. patent application Ser. No. 17/832,095, filed 3 Jun. 2022, now U.S. Pat. No. 11,607,688, issued Mar. 21, 2023, which is a continuation of U.S. patent application Ser. No. 16/603,106 filed 4 Oct. 2019, now U.S. Pat. No. 11,376,592, issued Jul. 5, 2022, which is a national stage application under 35 U.S.C. § 371 of International Application No. PCT/GB2018/051027, filed 19 Apr. 2018, which claims priority to Great Britain Patent Application No. 1706205.0, filed 19 Apr. 2017. The above referenced applications are hereby incorporated by reference into the present application in their entirety.

BACKGROUND

Instruments for particle sorting have widespread uses in biological research. A major application of particle sorting technology is to sort biological cells. Instrumentation for sorting cells based on measurements of fluorescent labels within the cells is typically known as fluorescence activated cell sorting (FACS). Other applications of particle sorting include the sorting of solid beads or liquid droplets of one liquid phase in a carrier fluid. For example, aqueous droplets in a non-aqueous carrier fluid can be used to contain cells. Thus, the particles to be sorted may, for example, be cells, beads, or droplets containing further particles.

A new application of cell sorting technology is the production of cell therapies. Many newer cell therapies require the sorting of large numbers of cells. For example, many new autologous T-cell therapies require sorting of relatively rare subsets of T-lymphocyte cells from peripheral blood mononuclear cells (PBMCs). Typically, large numbers of cells must be sorted in a reasonably short amount of time (e.g. $10^9$ cells in around an hour), and the desired cells (which may typically compose 1-10% of the total PBMCs) must be recovered with high purity, yield and viability. There is currently no sorter technology capable of fulfilling these requirements, in the form of either a research instrument or a cell therapy manufacturing instrument.

Other disadvantages of current cell sorting instruments are that they are not suitable for GMP (good manufacturing practice) production of therapeutic products, since they are not considered 'safe by design' for the operator or patient. This is because the fluid-wetted components are difficult to separate from the instrument into an enclosed single-use consumable, and they produce aerosols which may harm the operator.

The solutions described herein provide a particle sorting technology that is suitable for sorting a large number of cells, at high viability, yield and purity, in a short amount of time, in an enclosed microfluidic chip that may be integrated into a single-use consumable.

Many microfluidic particle sorting technologies have been invented in the last couple of decades, although few have reached commercial application. A common theme is that of a 'single-junction sorter', where an inlet channel bifurcates into two output channels: a 'sort' channel and a 'waste' channel. Particles entering the inlet channel are focused into the centre of the input channel, typically by a hydrodynamic focusing region, and the outputs are hydrodynamically biased towards the waste channel, such that the centre streamline flows into the waste. An actuator, which is positioned at or upstream of the bifurcation point, selectively exerts a force on a desired particle (or on the fluid around the desired particle) in order to move it away from the centre streamline and into the sort channel. Microfluidic particle sorters with various actuators have been demonstrated, for example actuators based on standing surface acoustic waves, transient surface acoustic waves, piezo-actuated displacement, micromechanical valves, optical tweezers, electrophoresis, dieletrophoresis and thermal vapour bubbles created by laser absorption or by electrical heating.

The focusing of the particles into the centre of the inlet channel is an important part of many particle sorters for two reasons: firstly it allows a greater precision of optical measurement of the particles by a focused laser beam; secondly it allows a smaller deflection of the particle by the actuator to push the particle from waste stream to sort stream. Alternatives to hydrodynamic focusing are acoustic focusing, described by U.S. Pat. No. 7,340,957 and inertial focusing, described by U.S. Pat. No. 9,347,595.

Microfluidic particle sorters employing thermal vapour bubble actuators have been demonstrated. The bubbles are created by electrical heating. The thermal vapour bubble actuator is placed within a side channel. The effect of the side channel is to focus and amplify the fluid displacement caused by the bubble, so that a particle can be sorted by the transient displacement directly caused by the bubble itself. However, the side channel is disadvantageous in that it complicates the microfluidic chip, requiring space on the chip and its own inlet or fill port.

In the case of fragile particles, such as biological cells, there is an upper limit on the sort rate that can be achieved with any single-junction sorter. This upper limit is of the order of the maximum shear stress that the particle can withstand without damage. For mammalian cells, this rate is around 20,000 $s^{-1}$. Therefore, no single-junction sorter of this format can achieve the specified sort rate of $10^9$ cells in an hour, or 280,000 per second.

The attempt to parallelize particle sorters within a microfluidic chip (in order to increase the sort rate) has encountered formidable technological challenges that stem from the need to parallelize the optical instrumentation to measure the array of parallel sorters on the chip. For example, for laser-illuminated fluorescence measurement in a parallel sorter, the laser foci have to be split or parallelized, and simultaneously aligned with the array of microfluidic sorters. Then the collection optics has to be parallelized, either by scanning across the array or providing an array detector for each emission wavelength channel. To collect light from a sorter at high sensitivity requires a high-numerical-aperture objective lens. However, an array of parallel sorters on chip occupies a wider field of view than a single channel. Therefore to achieve an equivalent light collection efficiency requires a proportionally larger and more expensive objective lens, as well as larger and more expensive filters and other elements of the optical system. A one-dimensional array of sorters makes poor use of the two-dimensional field of view of an objective lens. Furthermore, to minimize the lateral dimension of an array of sorters on a microfluidic chip is challenging, since space is used by the input and output manifolds, the hydrodynamic focusing region, and the actuator, all of which must be parallelized. In a parallelized microfluidic sorter, all of the individual sorters must work simultaneously at high fidelity, otherwise the purity and yield of the sorted particle population worsen significantly.

SUMMARY OF INVENTION

According to an aspect of the invention there is provided a single-junction sorter for a microfluidic particle sorter, the single-junction sorter comprising: an input channel, configured to receive a fluid containing particles; an output sort channel and an output waste channel, each connected to the input channel for receiving the fluid therefrom; a bubble generator, operable to selectively displace the fluid around a particle to be sorted and thereby to create a transient flow of the fluid in the input channel; and a vortex element, configured to cause a vortex in the transient flow in order to direct the particle to be sorted into the output sort channel.

The vortex element causes a vortex to be created in the transient flow, which is provided by actuation of the bubble generator. The resultant vortex travels downstream with the particle to be sorted and causes a displacement (i.e. laterally of the flow axis) of the particle toward and into the output sort channel. This displacement is larger than the displacement that would be caused by the actuation of the bubble generator in the absence of the vortex element, and the vortex element therefore obviates the need for a bubble generator provided in a side channel. This advantageously allows for single-junction sorters according to the present invention to be efficiently parallelized on a chip.

As used herein, the word "particle" encompasses biological cells, solid beads, and liquid droplets of one liquid phase in a carrier fluid (such as aqueous droplets in a non-aqueous carrier fluid). Liquid droplets may themselves contain further particles.

As used herein, the word "fluid" encompasses both aqueous and non-aqueous fluids, typically in the liquid or gas phase. For the purposes of the present invention, such a fluid typically contains particles, although fluids not containing particles may also be used.

The skilled person will understand that the terms "particle" and "fluid" are not limited to the above definitions should also be interpreted according to their understood meanings in the art.

Throughout this specification, the terms "output sort channel", "sort output channel", and "sort outlet" are used interchangeably. Similarly, "output waste channel" should be read as interchangeable with "waste output channel" and "waste outlet".

The vortex element may comprise a protrusion in the input channel. The vortex element may comprise a turn in the input channel. The vortex element may comprise a recess in the input channel. The vortex element may be between the bubble generator and the output sort channel. It will be understood that the vortex element may take any shape, form or geometry which is suitable to provide a vorticial flow for directing the selected particle to the output sort channel.

The bubble generator may comprise a microheater. In this case, the fluid may be any liquid that is sufficiently volatile for the microheater to generate a bubble, such as water, an aqueous solution, or a non-aqueous carrier medium.

The single-junction sorter may be configured, in the non-operation of the bubble generator and thereby absence of the said transient flow, to direct the particles into the output waste channel.

The single-junction sorter may comprise an inertial focuser configured to centralise the particles in the fluid along a centre of the input channel. The inertial focuser may comprise a serpentine channel. The input channel may comprise the inertial focuser.

Debris may accumulate during operation of a single-junction sorter according to an embodiment of the first aspect of the invention. In order to address this issue, a single-junction sorter may comprise a valve configured to close to prevent the fluid passing through the output sort channel in order to disrupt the flow of the fluid and thereby direct accumulated debris towards the output waste channel.

As used herein, the word "valve" encompasses conventional flow control devices, such as a normally-open solenoid valve, as well as flow restrictors capable of selectively substantially stopping the flow in the sort output channel of the disclosed embodiments.

The valve could be substituted for any sort of flow restriction device, flow restrictor, closure mechanism/means, flow diverting mechanism/means or blocking mechanism/means that is capable of selectively substantially stopping the flow in the support output channel in order to direct debris into the waste channel. Furthermore, it is not necessary for the channel to be completely blocked, so long as the flow is sufficiently restricted to disrupt the flow of the fluid and direct accumulated debris towards the output waste channel.

According to another aspect of the invention there is provided a microfluidic particle sorter, comprising an array of single-junction sorters each as described herein above.

The microfluidic particle sorter may comprise an array of microlenses, each microlens being aligned with a respective one of the array of single-junction sorters.

In the microfluidic particle sorter: the input channels of the single-junction sorters may be connected to a common inlet via an inlet manifold; the output waste channels of the single-junction sorters may be connected to a common waste outlet via a waste manifold; and the output sort channels of the single-junction sorters may be connected to a common sort outlet via a sort manifold.

The microfluidic particle sorter may comprise an objective lens arrangement including one or more objective lenses. The objective lens arrangement may be configured to deliver light to and collect light from every single-junction sorter of the array of single-junction sorters for the purpose of characterizing the particles in the fluid. Thus, the light for control of sorting and particle characterization is delivered and collected through at least one objective lens, covering the whole area of the two-dimensional array of single-junction sorters, as the objective lens arrangement is configured to illuminate the whole area of the two-dimensional array.

According to an aspect of the invention there is provided a method of sorting particles using a single-junction sorter as described herein above, the method comprising: providing the input channel with a flow of fluid containing particles; and operating the bubble generator in order to selectively displace the fluid around a particle to be sorted, thereby to create a transient flow of the fluid in the input channel which encounters the vortex element, so as to cause a vortex in the transient flow in order to direct the particle to be sorted into the output sort channel.

A further aspect of the invention provides a particle sorter comprising: an input channel configured to receive a fluid; an output sort channel and an output waste channel, each connected to the input channel for receiving fluid therefrom; and a valve configured to close to prevent the fluid passing through the output sort channel in order to disrupt the flow of the fluid and thereby direct accumulated debris towards the output waste channel.

The present invention also provides a method of clearing accumulated debris in a particle sorter of said further aspect of the invention, the method comprising: directing a fluid into the input channel; and closing the valve, thereby disrupting the flow of the fluid to direct the accumulated debris towards the output waste channel.

BRIEF DESCRIPTION OF THE FIGURES

Embodiments will now be described, by way of example, with reference to the accompanying figures in which.

DETAILED DESCRIPTION

Figure 1:
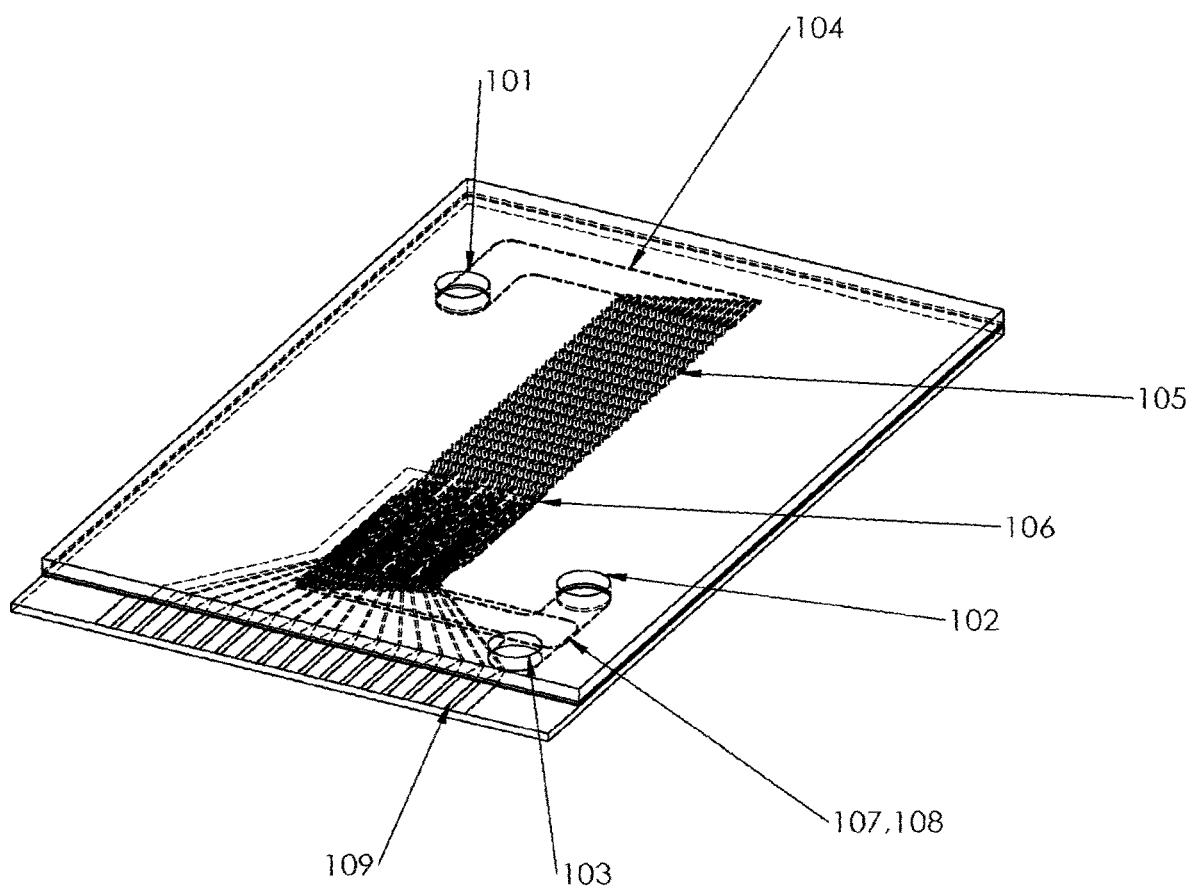
FIG. 1 shows a two-dimensional array microfluidic sorter chip.

The sorter is embodied by a microfluidic chip pictured in FIG. 1, having an inlet port 101, and two outlet ports: a waste outlet 102 and a sort outlet 103. Downstream of the inlet port is first the inlet manifold 104, followed by the inertial focusing region 105, then the two-dimensional array of single-junction sorters 106, then the waste and sort manifolds (107 and 108, overlaid in the diagram), which connect to the waste and sort outlets. On the edge of the chip is an electrical connector 109.

Figure 2:
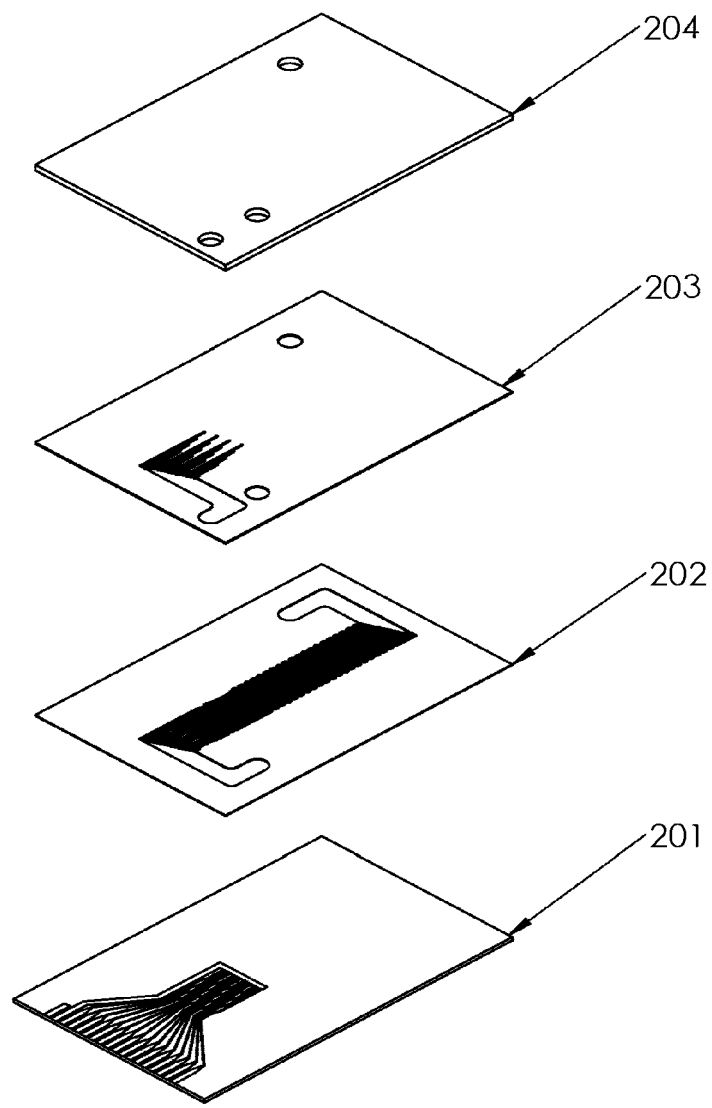
FIG. 2 shows details of the chip construction, including the layer fabrication structure.

The chip construction is detailed in FIG. 2, and consists of several layers of different functions. The first layer 201 is a glass sheet of thickness 300 μm, which seals the chip on the lower face and provides the substrate for the deposition of thin film features that make the thermal vapour bubble actuator and electrical contacts (described below). The second layer 202 consists of a micromoulded sheet of polydimethylsilicone (PDMS) with a thickness of 60 μm, and contains a set of microchannels described below. The third layer 203 consists of a micromoulded layer of cyclic olefin copolymer (COC) of thickness 300 μm, and contains microchannels on one side with a depth of 60 μm, and through-layer vias with a length of 240 μm. The fourth layer 204 consists of micromoulded COC of thickness 300 μm, and seals the chip on the upper face. The layers are bonded together using organosilane surface functionalisation, plasma treatment, thermal fusion and alignment/bonding equipment known in the art.

Figure 3:
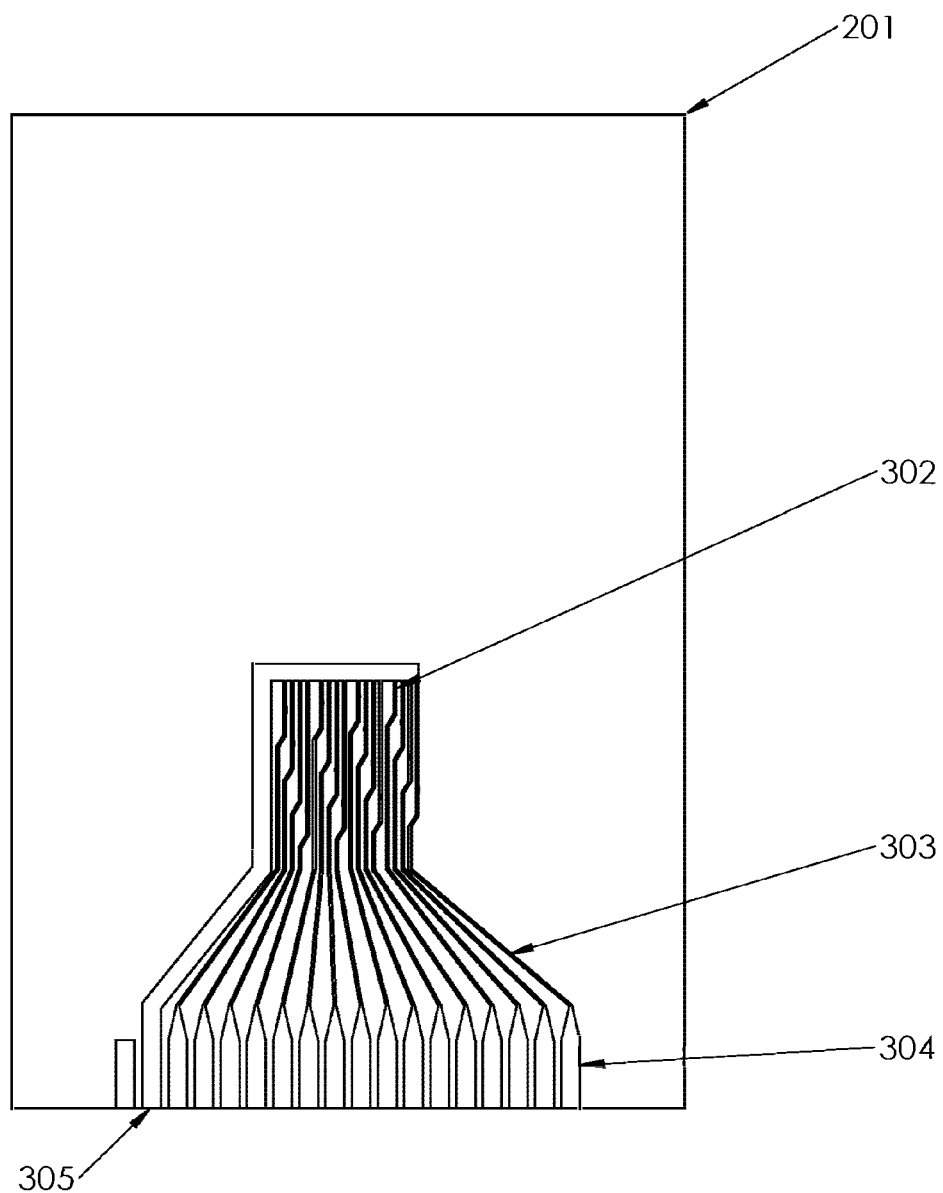
FIG. 3 shows details of the first layer of the chip.

FIG. 3 shows the design of the first layer 201. The thermal vapour bubble actuators comprise a two-dimensional four-by-four square array of thin film metal resistors 302, each henceforth referred to as a microheater. Each microheater is connected by conduction tracks 303 to a contact pad 304, and on the other side to a common ground pad 305.

Figure 4:
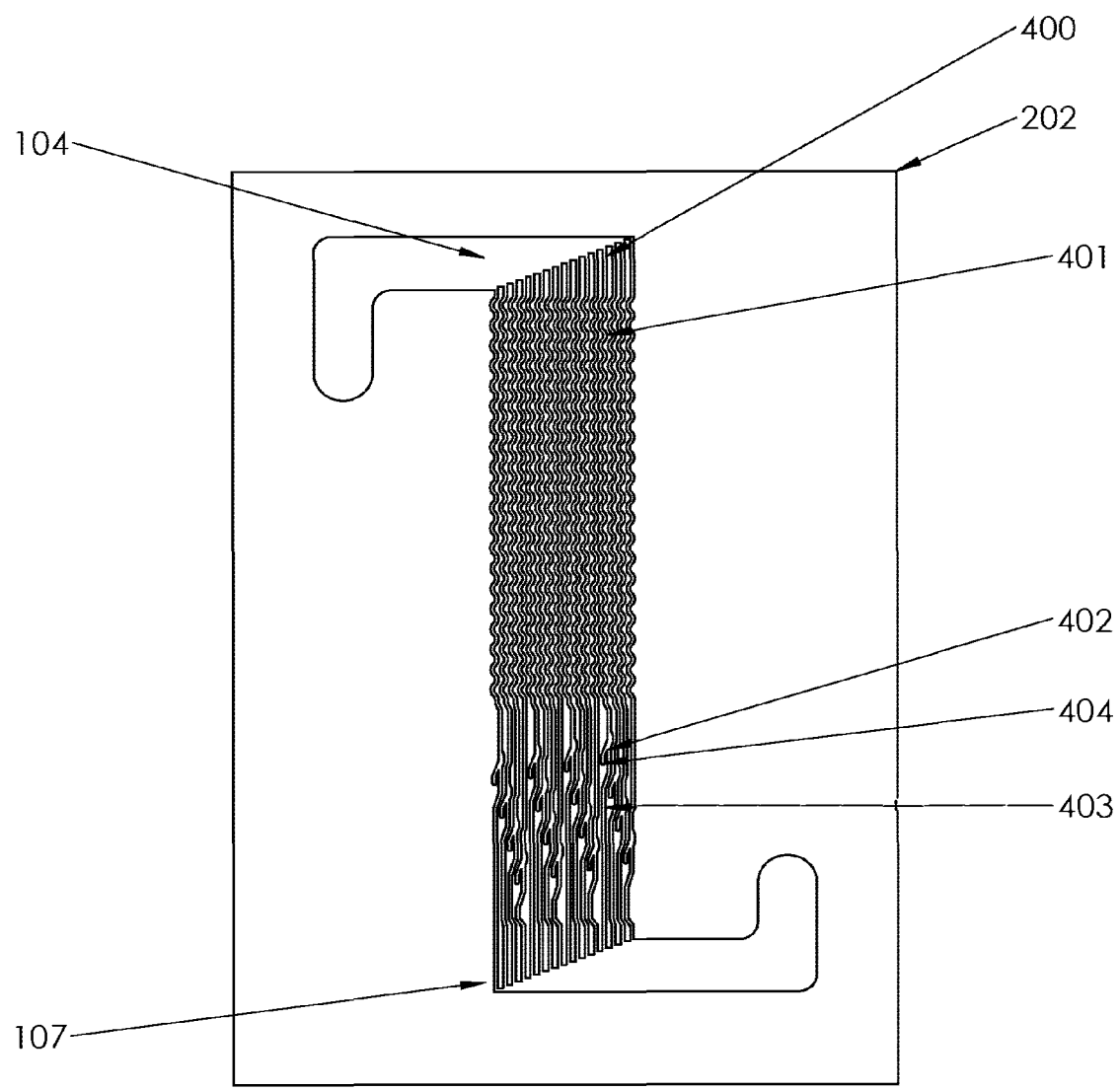
FIG. 4 shows detail of the second layer of the chip.

FIG. 4 shows the design of the second layer 202. The input manifold 104 splits into an array of 16 channels of width 100 μm and pitch 250 μm. Each of these channels is the input channel 400 of a single-junction sorter. The input channel comprises an inertial focusing section which consists of a symmetric serpentine channel 401. The input channel then connects to a sorter junction 402. The sorter junctions are placed on a two-dimensional four-by-four square array, which has a pitch of 1 mm in both directions, so that each sorter junction aligns with a microheater in the first layer (302, FIG. 3). (The exact alignment is detailed below.) At the sorter junction, the input channel splits into a waste channel of width 71 μm and a sort channel of width 56 μm. The waste channel 404 continues along the chip, where it is part of an array of 16 parallel waste channels that join the waste manifold 107. The sort channel 403 reaches an end point in the second layer, where it continues through a via into the third layer described below.

Figure 5:
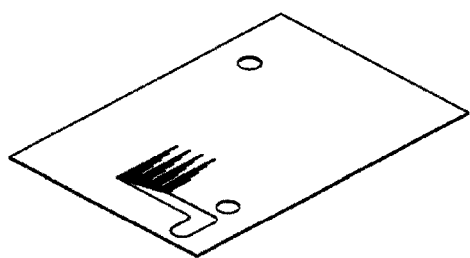
FIG. 5 shows details of the third layer of the chip, views 5a and 5b showing different perspectives the upper face of the third layer, view 5c showing the lower face of the third layer.
Figure 5:
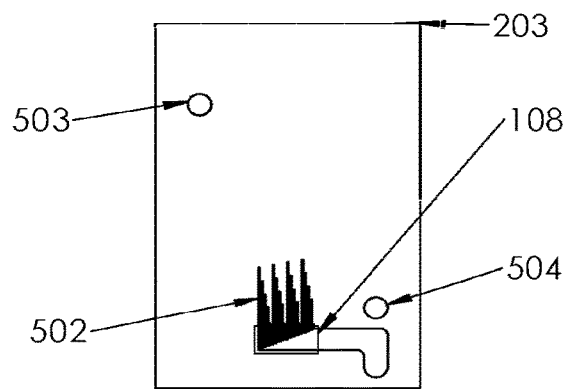
Figure 5:
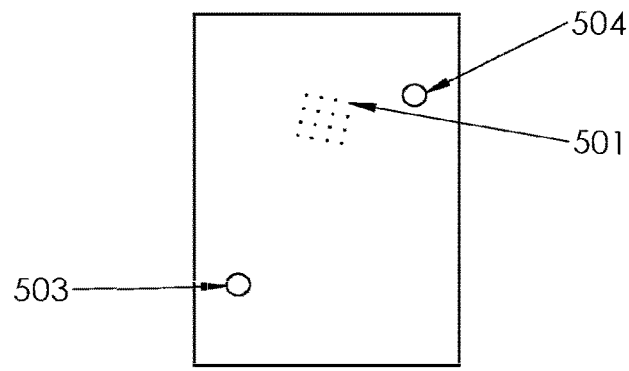

FIG. 5 shows the design of the third layer 203, and presents a perspective view (FIG. 5a) as well as a drawing of the upper face (FIG. 5b) and lower face (FIG. 5c). The third layer provides the continuation of the sort channels. The sort channel end points in the second layer are aligned with a two-dimensional four-by-four square array of through-layer via holes 501 each of diameter 100 μm. The sort channels continue from the lower face through these vias to an array of 16 parallel microchannels 502 on the upper face, each of width 56 μm. The sort channels then join the sort manifold 108. The third layer also provides a via for the input port 503 and a via for the waste output 504 that are aligned respectively with the end points of the input and waste manifolds in the second layer.

Figure 6:
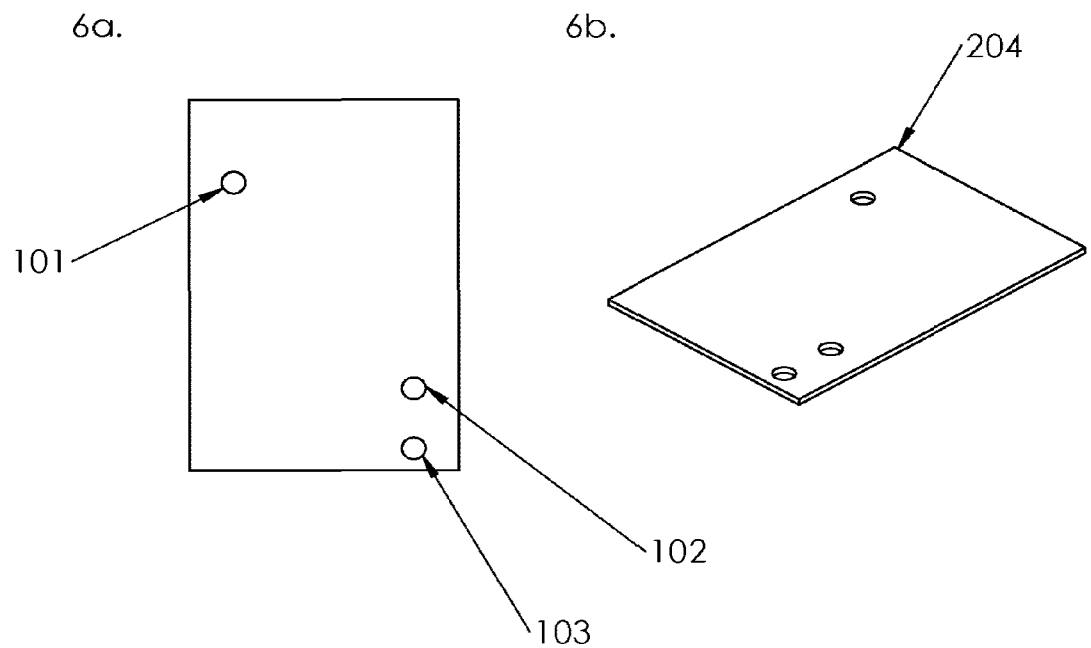
FIG. 6 shows details of the fourth layer of the chip from different perspectives, views 6a and 6b showing two perspectives of the upper face of the fourth layer.

FIG. 6 shows the design of the fourth layer 204, and presents a drawing of the upper face (FIG. 6a) and a perspective view (FIG. 6b). The fourth layer seals the microchannels of the third layer. It also provides the input port 101, the waste output port 102, and the sort output port 103. These ports consist of through-layer vias, which are aligned with vias 503 and 504 and the end point of the sort manifold 108 respectively.

Figure 7:
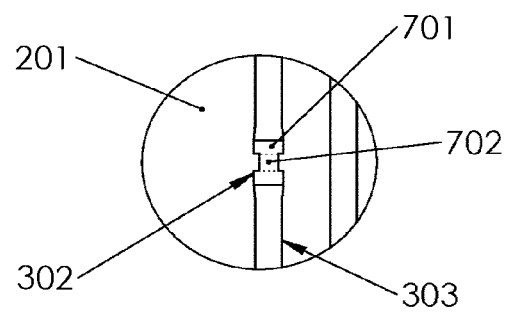
FIG. 7 shows details of the thermal bubble actuators in plan and cross-sectional profiles.
Figure 7:
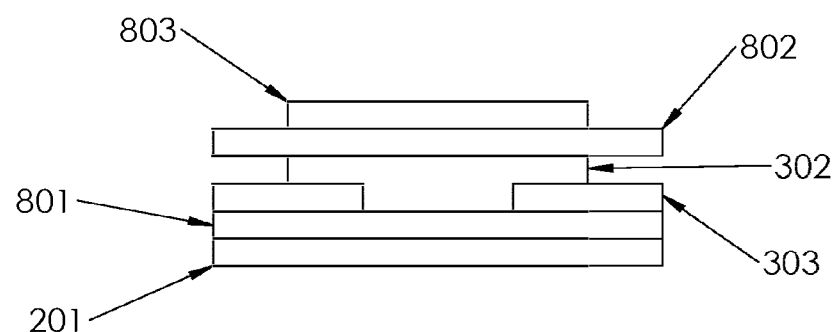

Details of the thermal bubble actuators are presented in FIG. 7, showing a drawing of the plan view (FIG. 7a) and a schematic of the cross sectional profile (FIG. 7b). The microheater 302 comprises a connector section 701, which overlaps with the conduction tracks 303, and a square section 702 of dimension 50×50 μm, which is the active part of the microheater since it does not overlap with any other conductor. The thermal bubble actuator comprises several layers fabricated by thin film deposition techniques on top of the glass substrate 201. These are in order: a passivation layer 801 of thickness 150 nm composed of silicon nitride, a resistor 302 of thickness 100 nm composed of titanium, a second passivation layer 802 of thickness 150 nm composed of silicon nitride, and an anti-cavitation layer 803 of thickness 250 nm composed of tantalum. The conduction tracks are composed of 20 nm of nickel-chromium and 100 nm of gold.

Figure 8:
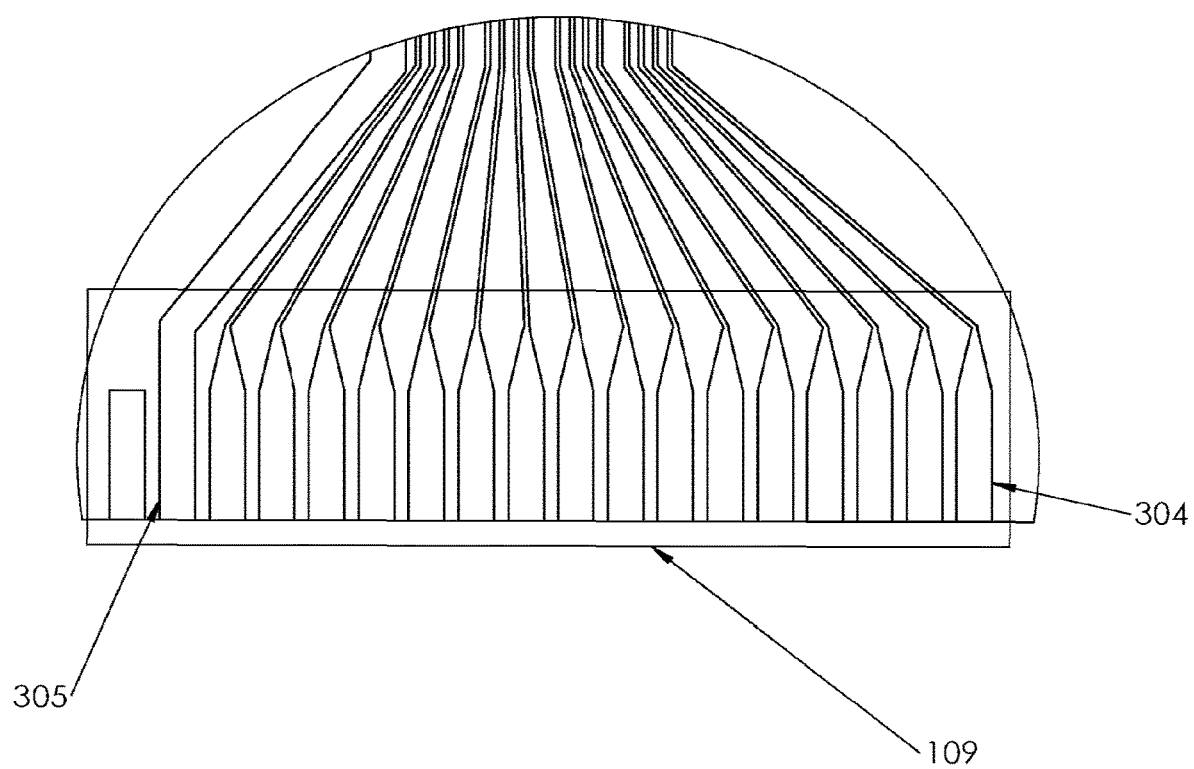
FIG. 8 shows details of the electrical connector.

The thermal bubble actuators are connected via their conduction tracks to the electrical connector 109: the design of this is shown in FIG. 8.

Figure 9:
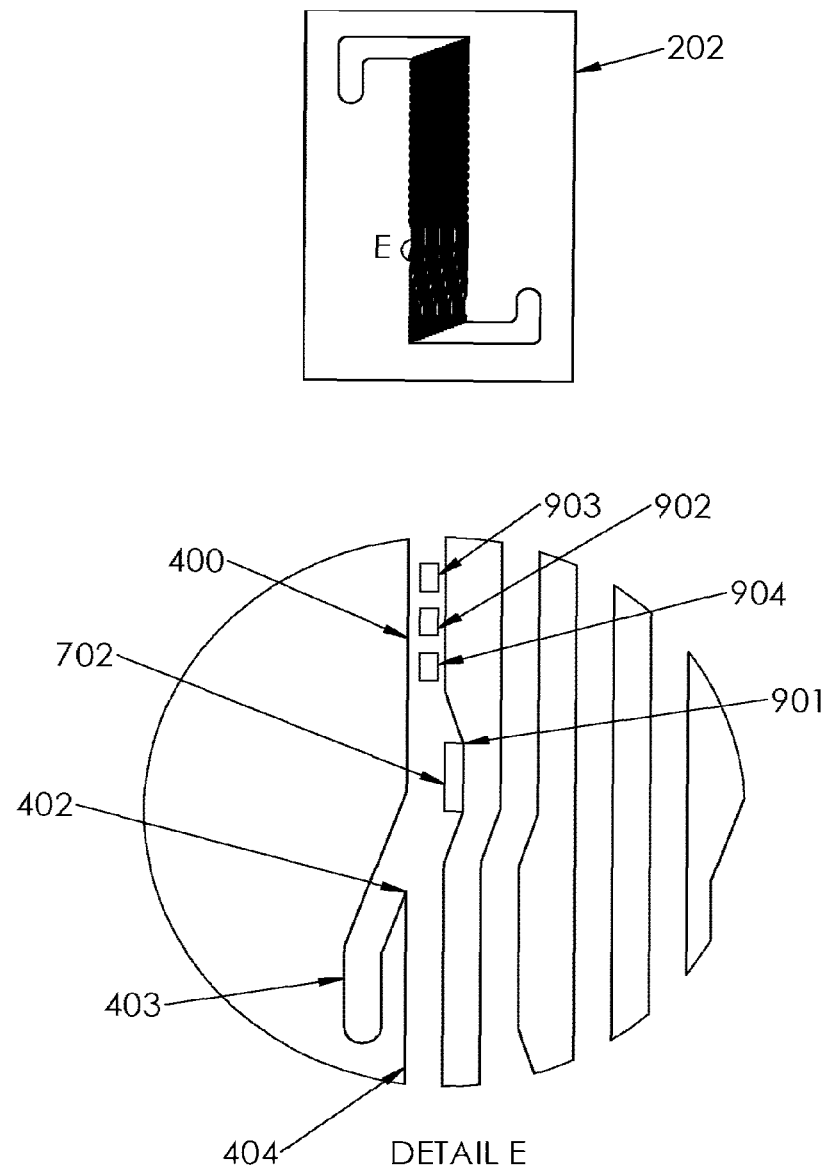
FIG. 9 shows details of the single-junction sorter.
Figure 10:
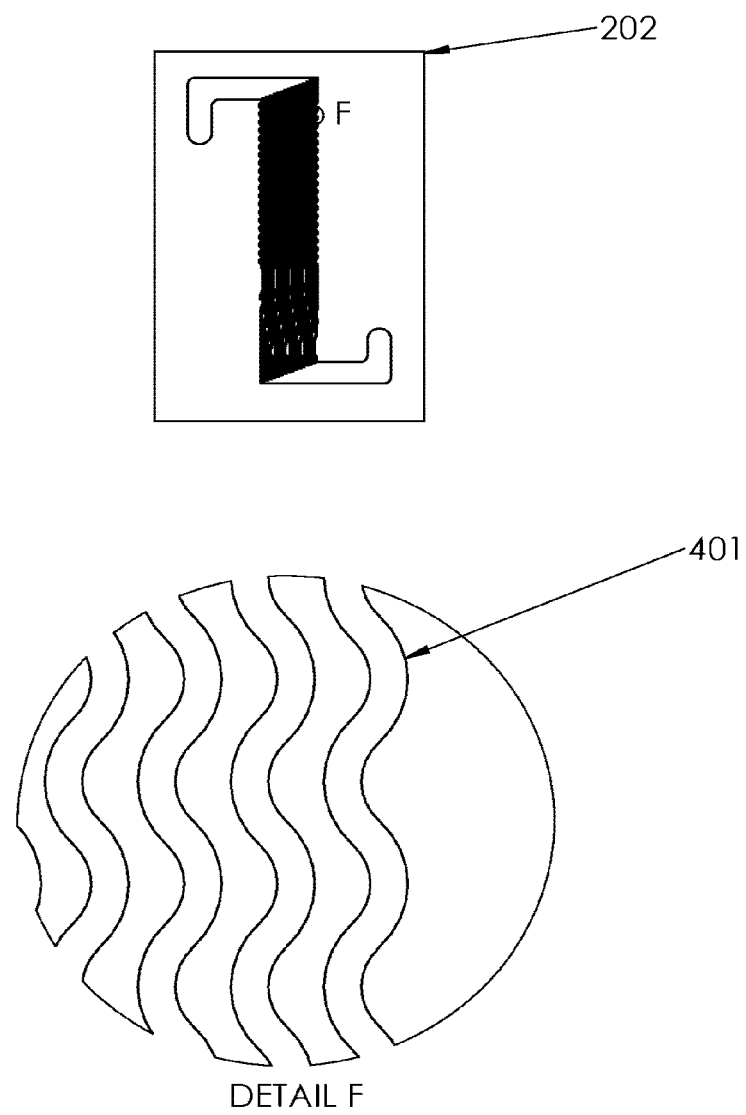
FIG. 10 shows details of the inertial focuser.

The details of the individual single-junction sorter are shown in FIG. 9 and FIG. 10. FIG. 9 shows the sorter junction 402, where the input channel 400 divides into the sort channel 403 and the waste channel 404. A recess 901 of width 50 μm in the side of the input channel is aligned with the active part of the microheater 702, and positioned 300 μm upstream of the junction. FIG. 10 shows the inertial focuser 401, which consists of a symmetric serpentine channel. Each inertial focuser consists of 40 circular arcs of alternating direction, each of radius 210 μm (at the channel centre line) and arc angle 90°.

Figure 11:
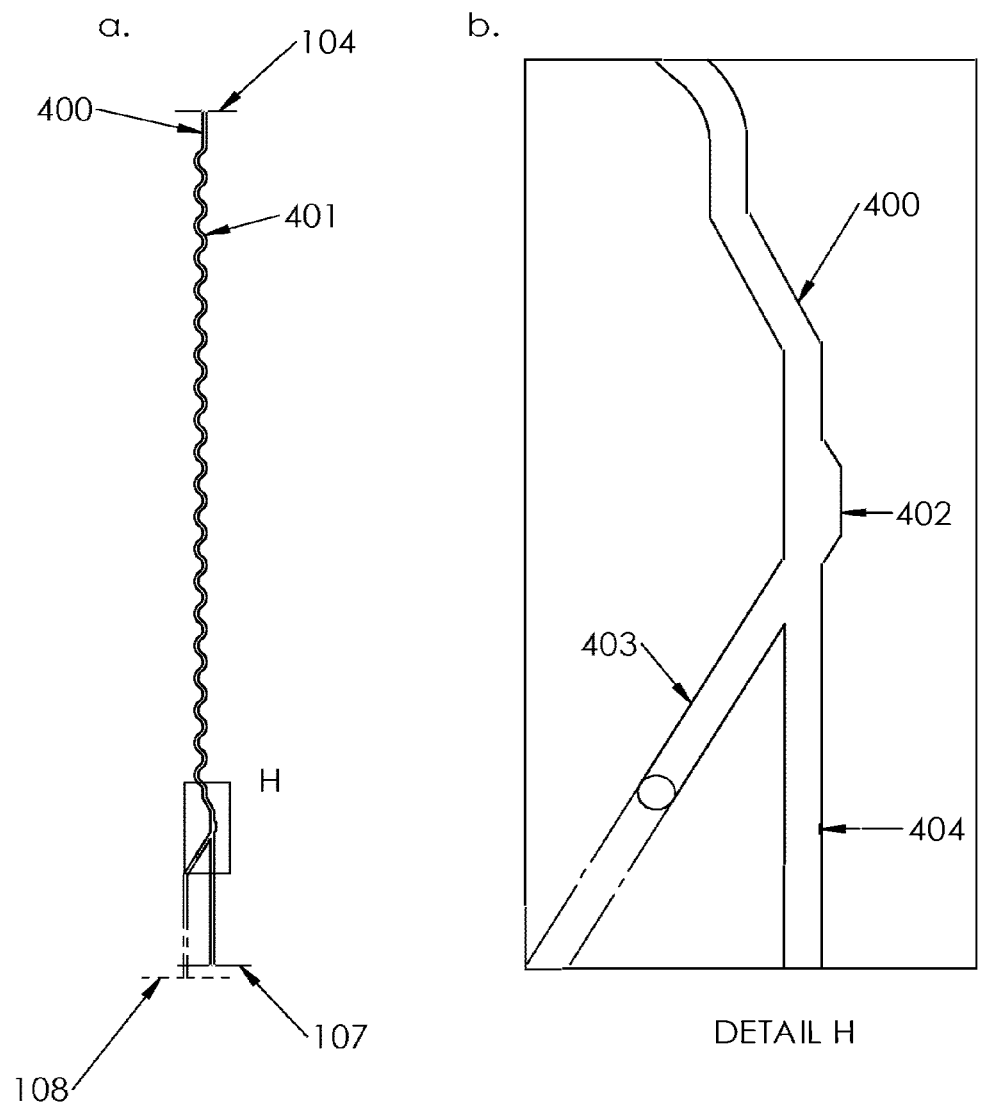
FIG. 11 shows details of a second embodiment of the single-junction sorter.

A second embodiment comprising only one single-junction sorter is shown in FIG. 11. The inlet manifold 104 is connected to the inlet channel 400, which contains the serpentine inertial focusing section 401. The inlet channel then reaches the sort junction 402 and splits into the sort channel 403 and waste channel 404. These continue to join with the sort manifold 108 and waste manifold 107 respectively.

Figure 12:
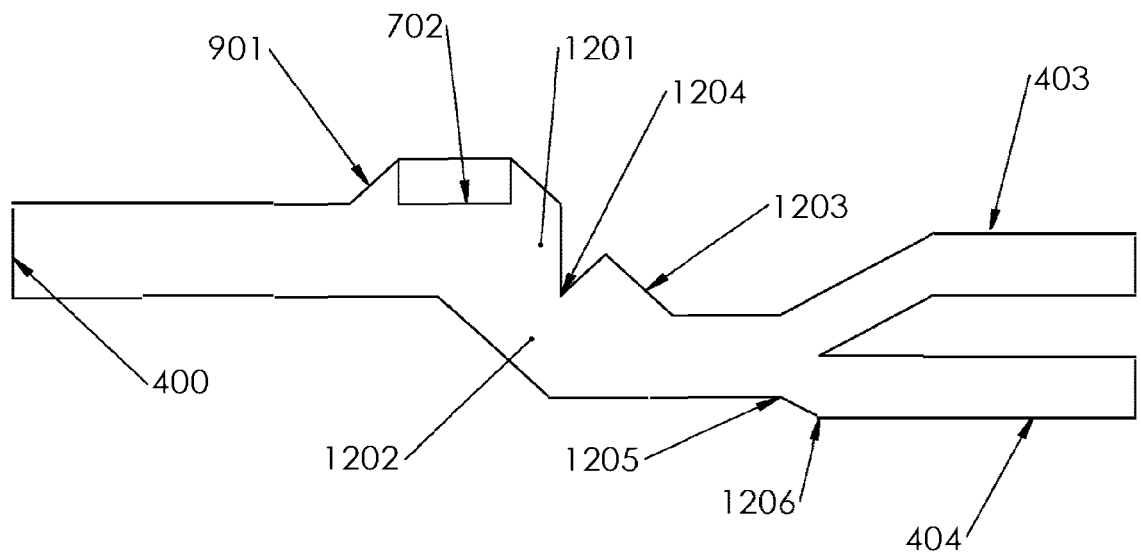
FIG. 12 shows details of a third embodiment of the single-junction sorter.

A third alternative embodiment of the single-junction sorter is shown in FIG. 12. It comprises a main inlet channel 400 (dimensions: 100 μm width, 60 μm height), with a microheater 702 (dimensions: 100 μm length, 40 μm width) situated in a recess 901 off the left wall (viewed looking downwards onto the chip, as in the figure). After the recess, the channel makes a 90° right turn 1201, continues for 100 μm, then makes a 90° left turn 1202. Immediately following the left turn, there is a second triangular recess on the left wall 1203 (with dimensions: 100 μm length, 40 μm width), such that an acute angle edge 1204 is formed between the left turn and second recess. Following the second recess, the channel contains a pinched region 1205 (90 μm width), before reaching an opened region 1206 (140 μm width), then splitting into two symmetric 60 μm width channels. The left channel is the sort channel 403 and the right channel is the waste channel 404.

The operation of the particle sorter is as follows.

The input particle suspension, which may be, for example, an aqueous suspension of lymphocytes of typical diameter 8 μm, at a density of up to around $4 \times 10^6$ cells/mL, is supplied to the input port 101 at a rate of approximately 5 mL/min. The input manifold 104 splits the suspension evenly into the 16 input channels 400.

The inertial focuser 401 causes the particles to align accurately in the centre of the input channel. It is designed to provide flow conditions as follows for a centre streamline flow velocity that is preferably between 1 m/s and 4 m/s, more preferably 2 m/s. For lymphocytes in aqueous suspension, the Dean number of this flow is approximately 20, the channel Reynolds number is around 120, and the particle Reynolds number is in the range 2-5. We have found experimentally that representative particles in such an inertial focuser spontaneously focus into the centre of the channel. Further embodiments may employ any kind of particle focuser as an alternative to the inertial focuser 401. Several kinds of particle focuser are known in the art that are able to accurately align particles with a streamline in a microfluidic channel, for example sheath flow or hydrodynamic focussing, acoustic focussing and dielectrophoretic focussing.

The particle is measured optically by a laser which is focused at 902 just upstream of the microheater 702. The optical measurements typically include fluorescence, forward scattering and back scattering of light, and the optical reader apparatus for their measurement is described below. The preferred embodiment has a single laser focus per single-junction sorter. However in alternative embodiments, separate laser foci may be provided in close proximity upstream of the microheater, e.g. at 903 and 904. A control system evaluates the optical measurements in real time and decides on whether to sort or reject each individual particle before it reaches the microheater.

If the decision is to reject the particle, then it carries on in its streamline, which passes into the waste channel 404. However, if the decision is to sort the particle, then the thermal vapour bubble actuator is activated, causing the particle to pass into the sort channel 403. The actuation operates as follows: an electrical pulse of voltage 20 V and duration 2 μs is applied between the contact pad 304 and ground pad 305, so that an electrical current flows and dissipates a controlled amount of energy at the microheater. The liquid in the channel adjacent to the microheater is rapidly heated and goes through a phase transition from liquid to gas, forming a microscopic vapour bubble that expands and collapses in around 10 μs. Thus the microheater actuates a transient displacement of the liquid around the particle. This displacement increases dues to the fluid's own inertia as the displaced fluid moves downstream, so that when the particle reaches the sorter junction 402, its lateral displacement is around 20 μm, which is sufficiently large to carry the particle into the sort channel instead of the waste channel.

The waste manifold 107 and sort manifold 108 collect the outputs of the 16 single-junction sorters, and carry them to the waste and sort output ports 102 and 103.

Figure 13:
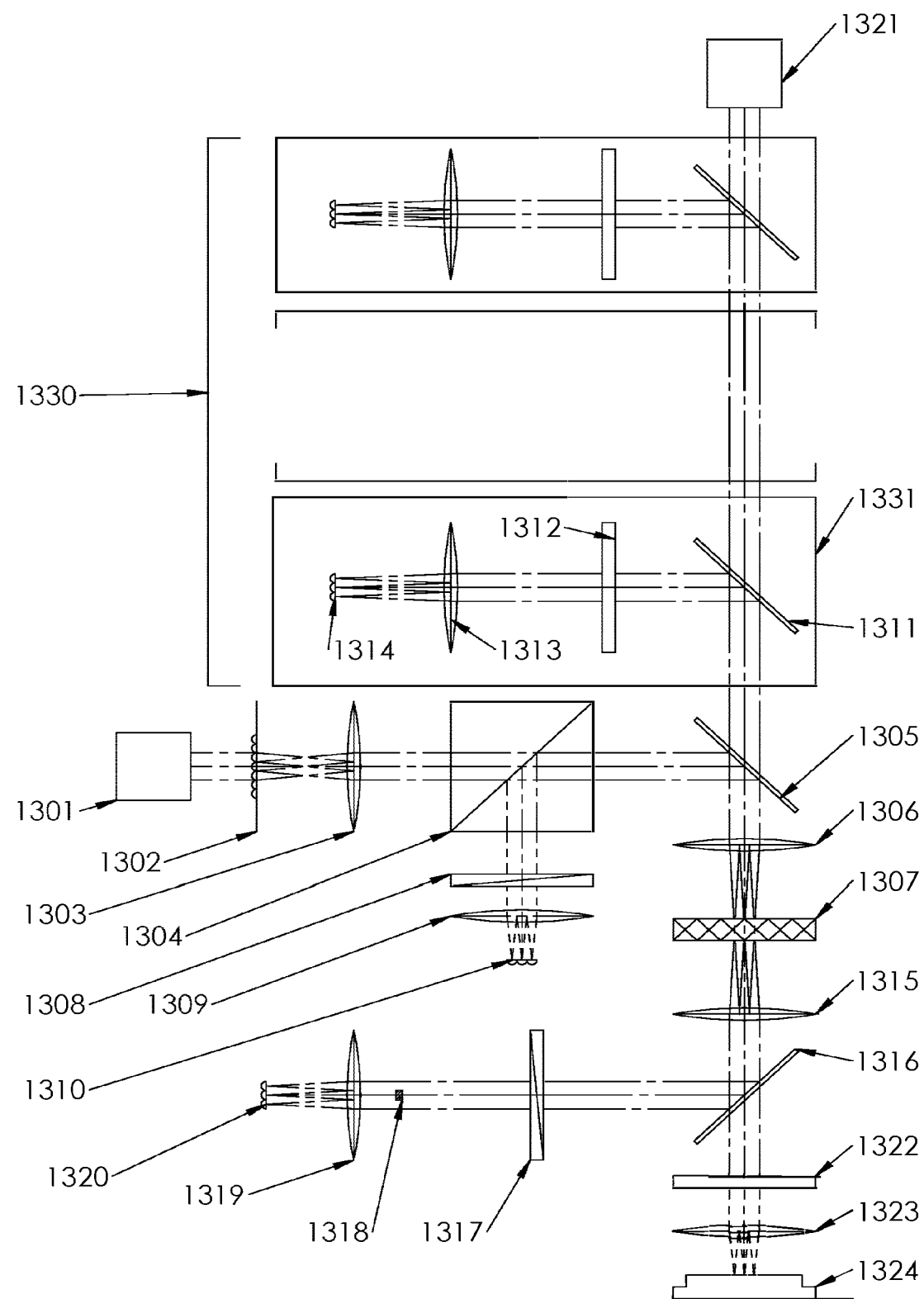
FIG. 13 shows details of an optical measurement apparatus.

The optical reader apparatus for measurement of fluorescence, forward scatter and back scatter measurements, is detailed in FIG. 13. A laser source of light 1301 is used for fluorescence excitation. The beam passes through a two-dimensional four-by-four microlens array 1302 which forms a two-dimensional pattern of dots which is then imaged onto the chip by lenses 1303 and 1306. Polarizing beam splitter 1304 transmits only one polarization of the light which then reflects from the long-pass dichroic mirror 1305. Lens 1306 focuses the light simultaneously onto the four-by-four array of single-junction sorters of the microfluidic chip 1307. (Each focus is made at position 902 on the individual single-junction sorter, as described above.) Back-scattered light that is reflected back from the microfluidic chip is collected by the lens 1306, after which it is reflected by the mirror 1305; then it enters the beam splitter 1304. The polarization orthogonal to the illuminating beam is then reflected and cleaned by polarizer 1308, then focused by lens 1309 and detected as a set of individual spots by a two-dimensional four-by-four array photodetector 1310.

While fluorescence detection may be collected according to alternative embodiments in epi- and through modes, epifluorescence detection is provided in this embodiment. The lens 1306 collects light from both back-scatter and fluorescence. The long-pass dichroic mirror 1305 transmits fluorescence light (which has a longer wavelength than the illumination light). This light then passes through a series of fluorescence detection modules 1330. Each module is designed to detect wavelengths within a specified band, and transmit longer wavelengths to the next module. Each fluorescence detection module 1331 has a long-pass dichroic mirror 1311, band-pass optical filter 1312, focusing lens 1313 and a two-dimensional four-by-four array of photodetectors 1314. Several different spectral ranges can be detected simultaneously by stacking modules with the correct choice of long-pass and band-pass filters, as is known in the art.

Forward-scattered light from the microfluidic chip is collected and collimated by lens 1315, then reflected by long-pass dichroic mirror 1316, after which it is filtered by polarizer 1317 to eliminate the directly transmitted light. The forward-scattered light then passes through dark field mask 1318 which blocks directly transmitted light and selects a band of angles for forward scatter detection. The forward-scattered light is then focused by lens 1319 and detected with a two-dimensional four-by-four array of photodetectors 1320.

In addition to the back scatter, forward scatter and fluorescence measurements, imaging of the microfluidic chip is provided, to allow for focusing and alignment of the illumination source onto the chip. The transmission imaging uses a second collimated light source 1321 which has a wavelength longer than those measured by the fluorescence detection modules. This light propagates through all the dichroic mirrors 1311, lens 1306, the microfluidic chip 1307, lens 1315, and dichroic mirror 1316. There is then an additional band-pass filter 1322 to remove stray light, then lens 1323 focuses the light onto the camera 1324. The light source 1321 provides constant illumination or short pulses triggered from particle detection events to allow monitoring and control over the sorting procedure.

In a further embodiment, the microfluidic chip is integrated with a two-dimensional microlens array attached to the glass substrate side opposite to the microchannels. Each lens is aligned with the laser focus point 902 on each a single-junction junction sorter. The microlenses serve to increase the efficiency of fluorescence collection from each single-junction sorter.

Figure 14:
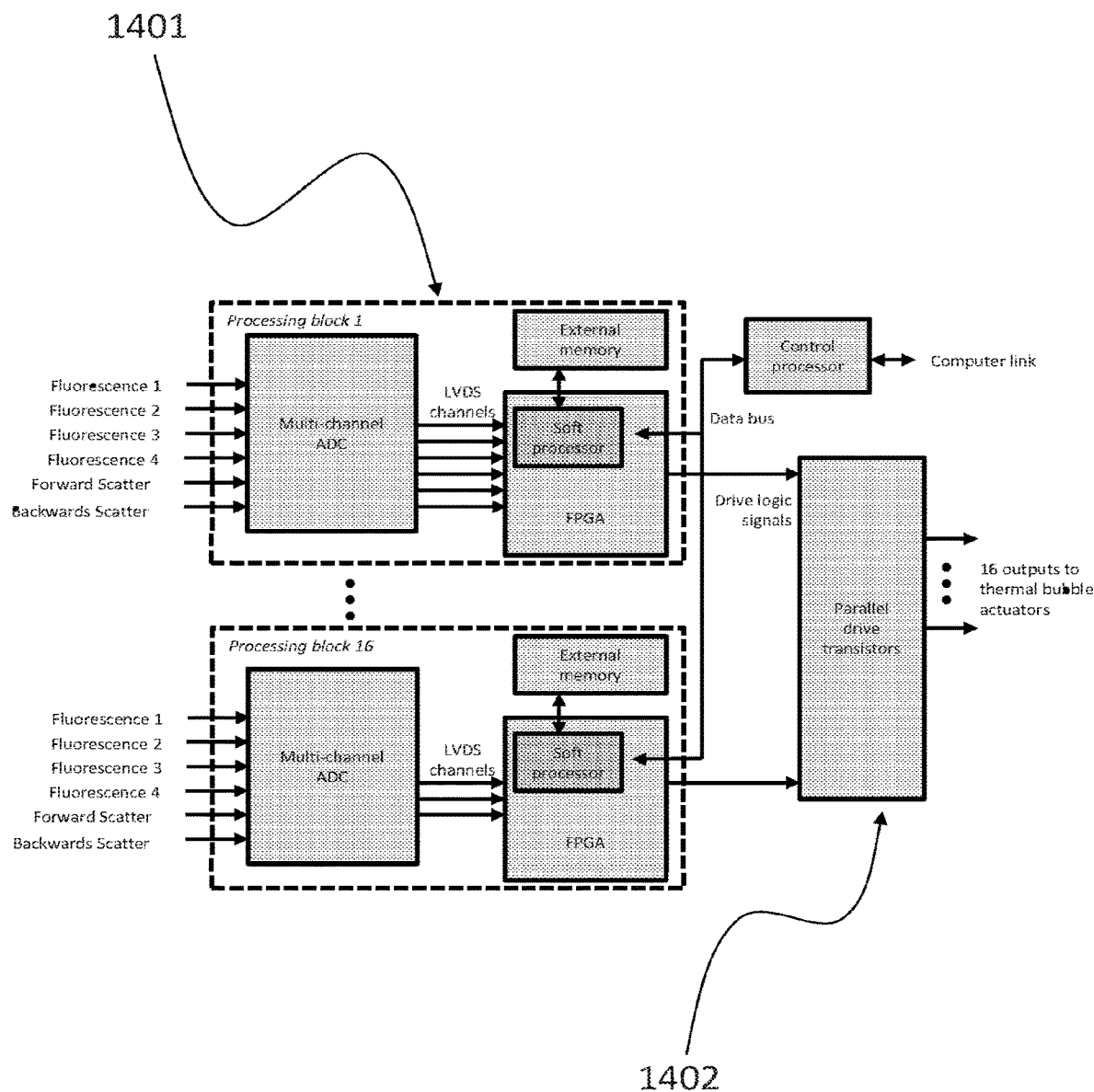
FIG. 14 shows details of a control system.

The sorter's control system is detailed in FIG. 14 and described as follows. The control system has a signal processing block 1401 per single-junction sorter, thus making sixteen processing blocks for the four-by-four parallel microfluidic particle sorter. Each signal processing block has six analogue inputs for the four fluorescence channels, forward scatter and back scatter signals. A multi-channel analogue-to-digital converter (ADC) digitizes the signals and transmits them across a digital interface to a field programmable gate array (FPGA). The FPGA performs a peak detection and characterization algorithm, and makes a decision whether to activate the thermal bubble actuator for that channel to divert a cell. Peak detection and characterization algorithms are known in the field of cytometry and not further described here. The actuation signal is passed to a block of parallel drive transistors 1402.

In each signal processing block, an external memory is interfaced with a soft processor in the FPGA, and allows data from the peak characterization to be stored until they are required, such as at the end of a run to collect the cells' peak data for analysis. When these data are required, the control processor requests and uploads the data from each block sequentially. Additionally the control processor is used to send data to the FPGA such as thresholds and parameters for the peak-detection algorithm, parameters of the sorting pulse and commands to control the sorting process.

Figure 15:
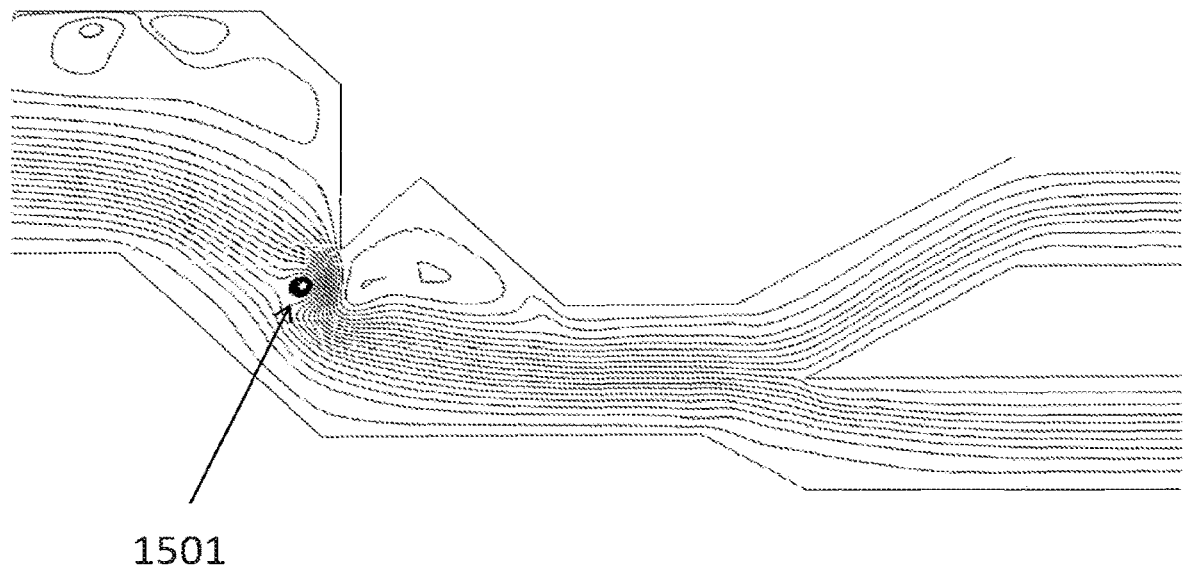
FIG. 15 shows the operation of the third embodiment of the single-junction sorter.
Figure 15:
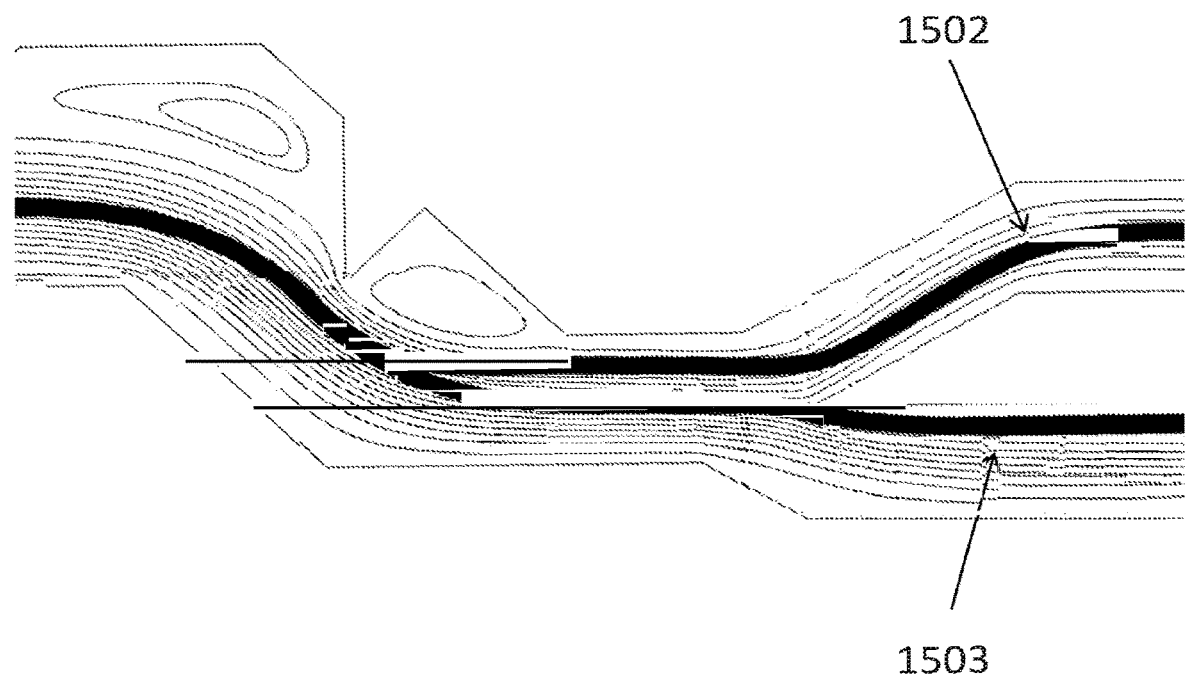

The effect of the thermal bubble actuation is amplified by the geometry of the single-junction sorter, which is shown by fluid flow simulations depicted in FIG. 15. Here we use the geometry of the third embodiment of the single-junction sorter above to demonstrate the fluid flow (refer to FIG. 12 for the geometric features). Due to the substantial inertia of the fluid (channel Reynolds number of around 120), the right turn 1201 and left turn 1202 cause a greater flow into the waste channel 404 than the sort channel 403, so that in the absence of a thermal bubble actuation, particles that approach the junction on the centre streamline will leave through the waste channel. However, when the thermal vapour bubble is actuated, the growth and collapse of the bubble rapidly displaces the fluid, first away from the microheater and then towards the microheater. As the bubble grows, the transient flow causes a vortex to form near the wall of the second recess 1203. At this point in time, the vortex is away from the main flow and has little interaction with the particles. However, when the bubble collapses, the transient flow causes a 'sorting vortex' 1501 to form around the acute angle edge 1204, which subsequently moves downsteam with the main flow. Because the sorting vortex moves downstream with the particle to be sorted, it causes a much larger lateral displacement of a particle than the direct displacement of the particle caused by the thermal vapour bubble alone. Trajectories of a sorted particle 1502 and an unsorted particle 1503 are shown.

Many alternative embodiments also create such a sorting vortex, for example where a recess, bend or edge is placed in the single-junction sorter upstream of the sorting junction.

Figure 16:
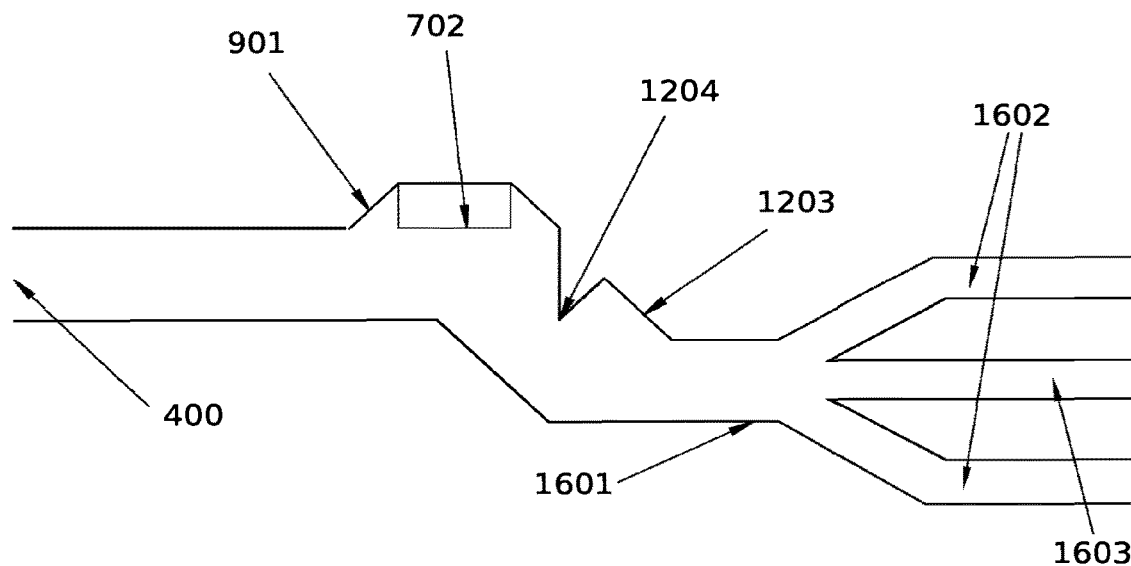
FIG. 16 shows alternative embodiments of the single junction sorter of the present invention that allow for multi-way sorting, with views 16(a) and 16(b) showing designs for 3- and 5-way sorting, respectively.
Figure 16:
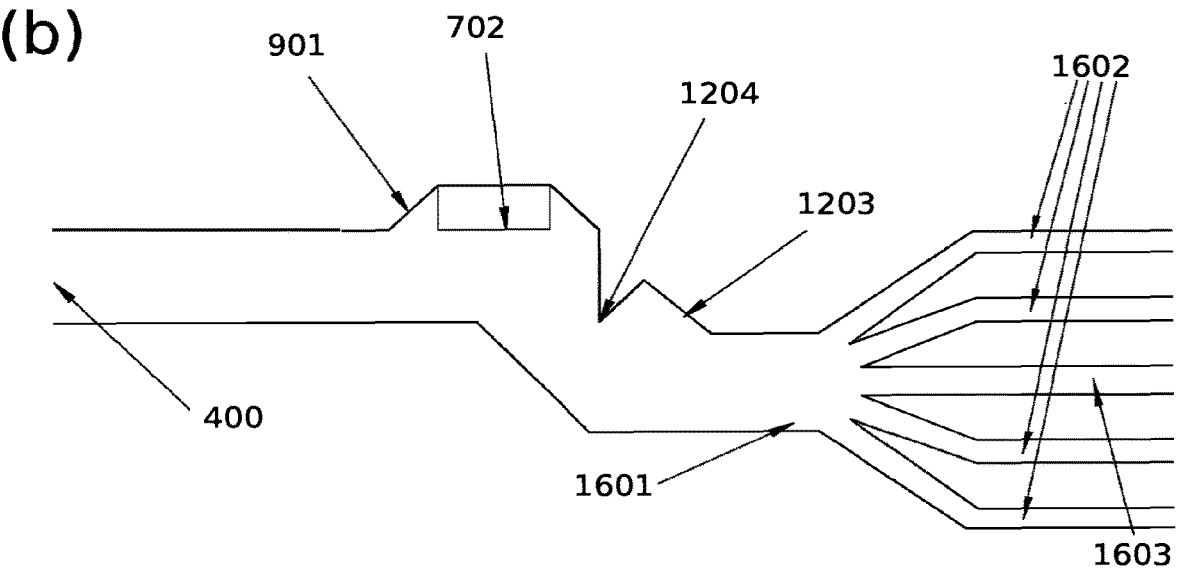

Further alternative embodiments of the single-junction sorter are shown in FIGS. 16(*a*) and 16(*b*), to allow for multi-way sorting. The embodiments shown in FIGS. 16(*a*) and 16(*b*) provide for 3- and 5-way sorting, respectively Each of these embodiments comprises a main inlet channel 400, a microheater 702 situated in a first recess 901 off the left wall (viewed looking downwards onto the chip, as in the figure). After the first recess 901, there is a second recess 1203 on the left wall, such that an acute angle edge 1204 is formed between the two recesses 901 and 1203. Following the second recess 1203, the channel contains a straight region 1601, before splitting into several symmetric channels 1602 and 1603. The central channel 1603 is the waste channel, and either side are separate sort channels 1602. Any number of sort outputs could be provided in alternative embodiments. In these alternative embodiments, the waste channel 1603 will typically be provided such that the fluid is substantially directed towards this waste channel 1603 during equilibrium flow of the fluid.

In operation, a single thermal bubble actuation is employed to displace a particle into any one of the multi-way sort outputs by the following method. The sorting vortex 1501 is characterised by a flow profile that varies in position with respect to the flow path: a particle ahead of the centre of the vortex is displaced towards the left, while a particle behind the centre of the vortex is displaced towards the right. The total displacement of a particle depends on the distance from the vortex. Thus, by careful timing of the actuation with respect to the particle position, the total displacement is calibrated to match the positions of the respective output channels. The control system is then programmed to give the actuation pulse at a set of time delays that correspond to each of the multi-way sort outputs.

In operation, for many types of particle suspensions, there is a tendency for debris to accumulate at the sort junction and clog or block the sorter. According to a further embodiment, a valve, such as a normally-open solenoid valve, is placed at (or downstream of) the sort outlet. This valve is capable of stopping the flow in the sort output channel. The technique to unclog the junction is to temporarily close this valve, which causes the flow to change around the sort junction, thus sweeping any debris into the waste channel. Typically the valve is closed for between 0.1 and 20 seconds, more typically for around 1 second, to have the unclogging effect. The valve can be actuated periodically or whenever debris is detected on the junction by using the camera.

In the case of the multi-way sorting embodiments (FIGS. 16(a) and 16(b)), the unclogging mechanism comprises a separate valve on each of the sort outputs. In operation, one or more sort outputs are temporarily closed to have the unclogging effect.

A valve could also be provided on the waste outlet, in addition to or as an alternative to the valve provided on the sort outlet, such that debris is directed towards one or more of the sort outputs when this valve is closed.

The valve could be substituted for any sort of flow restriction device, flow restrictor, closure mechanism/means, flow diverting mechanism/means or blocking mechanism/means that is capable of selectively substantially stopping the flow in the support output channel in order to direct debris into the waste channel. Furthermore, it is not necessary for the channel to be completely blocked, so long as the flow is sufficiently restricted to disrupt the flow of the fluid and direct accumulated debris towards the output waste channel.

The present invention provides a microfluidic particle sorter that is capable of sorting fragile particles (such as biological cells, beads, or droplets containing further particles) at a much higher sort rate than was hitherto possible. The invention achieves a high sort rate by providing a single-junction sorter that is suitable to be parallelized on a microfluidic chip. The single-junction sorters may be arranged on the chip in a two-dimensional array, which allows an efficient use of the field of view of the objective lens. This two-dimensional array is enabled by the design of the single-junction sorter, which allows a dense packing on the chip. Each single-junction sorter provides a bubble generator (e.g. a thermal vapour bubble generator) without a side channel, and a bifurcation of the stream into sort and waste channels. The geometry of the single-junction sorter is chosen so that the actuation of the thermal vapour bubble creates a 'sorting vortex', which travels downstream with the particle to be sorted, and thus causes a much larger lateral displacement of a particle than the direct displacement of the particle caused by a thermal vapour bubble alone.

A plurality of single-junction sorters may be arranged so that their input channels branch off a common input manifold, their sort output channels combine into a common sort manifold, and their waste output channels combine into a common waste manifold. The channel widths of the single-junction sorters may be chosen so that each single-junction sorter experiences the same input flow velocity and the same ratio of fluid flowing down the sort and waste outputs when a pressure difference is exerted between the input and output ports.

It will be understood that the invention has been described in relation to its preferred embodiments and may be modified in many different ways without departing from the scope of the invention as defined by the accompanying claims.

What is claimed is:

1. A method for sorting particles in a particle sorter, the method comprising:
   receiving, at an input channel, an input particle suspension comprising a fluid and a plurality of particles;
   aligning the plurality of particles in a plurality of streamlines of the fluid;
   evaluating the plurality of particles at a predetermined location and assigning, each of the plurality of particles, to one of a plurality of sort designations or a reject designation;
   responsive to assigning a particle to a sort designation of the plurality of sort designations, causing a creation of a transient flow in the fluid,
   wherein the transient flow is created at a position downstream of the predetermined location;
   responsive to causing the creation of the transient flow, causing formation of a sorting vortex in the fluid; and
   directing particles having the sort designation, via the sorting vortex, to an output channel of a plurality of output channels based on the assigned sort designation.

2. The method of claim 1, wherein the plurality of output channels comprises a first sort channel, a second sort channel, and a central reject channel located between the first sort channel and the second sort channel.

3. The method of claim 2, wherein the central reject channel is fluidly connected to a reject manifold configured to receive the plurality of particles having the reject designation.

4. The method of claim 1, wherein the plurality of output channels comprises a first pair of sort channels, a second pair of sort channels, and a central reject channel located between the first pair of sort channels and the second pair of sort channels.

5. The method of claim 1, wherein aligning the plurality of particles is performed using an inertial focuser comprising a plurality of circular arcs of alternating direction.

6. The method of claim 5, wherein each circular arc from the plurality of circular arcs has an approximate radius of 210 μm and an approximate arc angle of 90°.

7. The method of claim 1, wherein the plurality of particles in the plurality of streamlines is aligned via at least one of inertial focusing, hydrodynamic focusing, acoustic focusing, or dielectrophoretic focusing.

8. The method of claim 1, wherein causing formation of the sorting vortex comprises repeatedly applying an actuation pulse at a predetermined time delay that is determined based on the position of the particle.

* * * * *